Nov. 24, 1953          W. H. MILLER          2,660,443
                       BOAT TRAILER

Filed March 28, 1951                    2 Sheets-Sheet 1

WILLIS H. MILLER
INVENTOR.

ATTORNEY

Nov. 24, 1953 W. H. MILLER 2,660,443
BOAT TRAILER
Filed March 28, 1951 2 Sheets-Sheet 2

WILLIS H. MILLER
INVENTOR.

BY

ATTORNEY

Patented Nov. 24, 1953

2,660,443

UNITED STATES PATENT OFFICE 2,660,443

BOAT TRAILER

Willis H. Miller, Irving, Tex.

Application March 28, 1951, Serial No. 217,965

1 Claim. (Cl. 280—33.4)

This invention relates to boat trailers and more particularly to an improved type of wheel suspension for trailers.

The principal object of the invention is to substitute for the single transverse axle of conventional design a pair of stub axles, each of which is suspended pivotally from a tubular tongue, constituting a part of a T-shaped main frame, by means of one of a pair of sub-frames of substantially V-shape. The vertex of each sub-frame is in rigid attachment to a stub axle and is held in yielding relationship with the cross-member of the main frame by a heavy coil spring.

Another object of the invention is to provide on the aft end of the tongue a rubber spool whose V-shaped groove receives the keel plate of a boat as the latter is drawn onto the trailer by means of a cable winch mounted on the opposite end of the tongue.

Still another object of the invention is to provide a cradle consisting of angular members mounted longitudinally on the main frame cross-member so that one will engage the boat bottom on each side of the keel plate, the angular position of each member being adjustable to adapt the members to boat bottoms of different shapes.

Other objects will appear as the description proceeds, taken in connection with the accompanying drawings wherein.

Figures 1, 2:
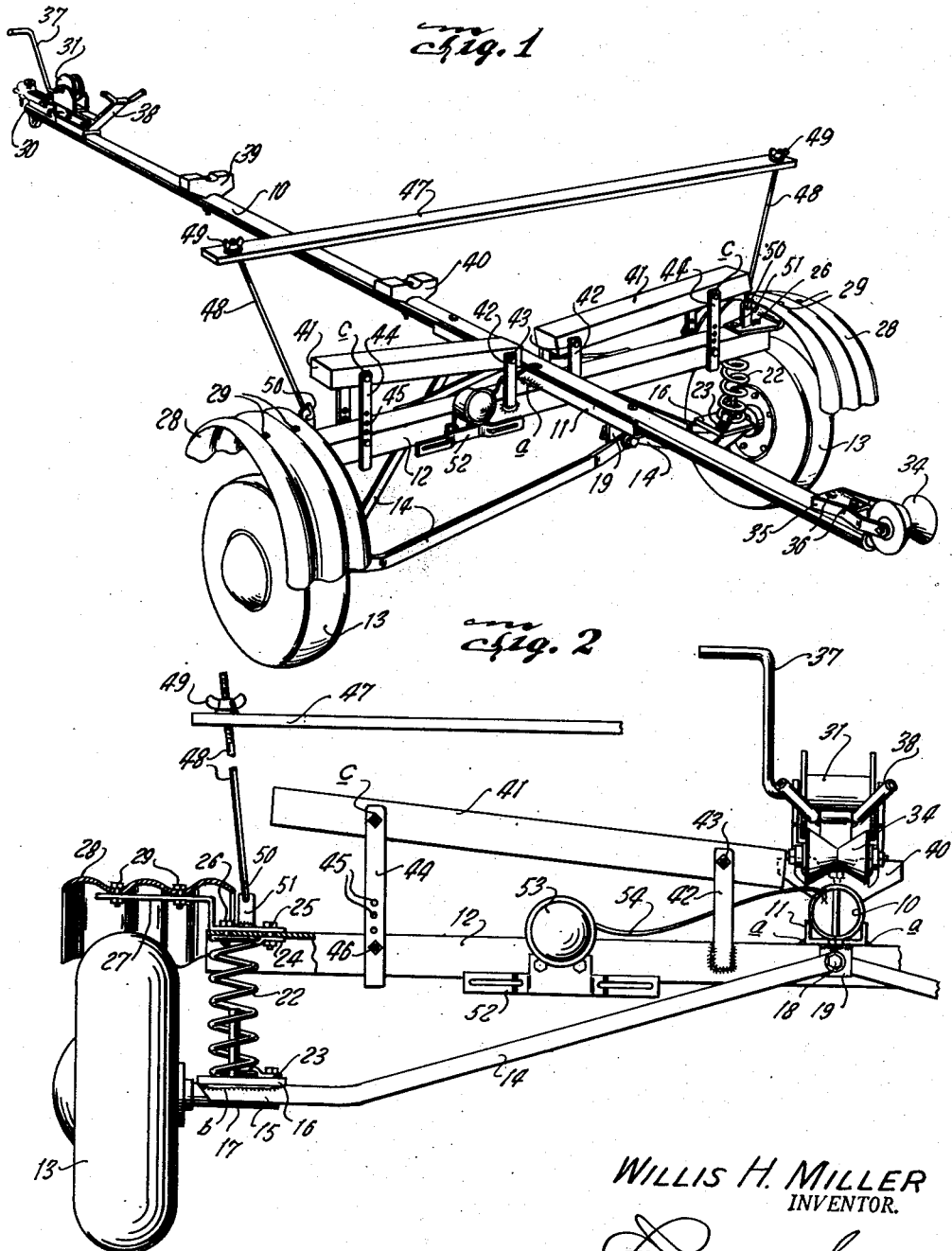
Figure 1 is a rear perspective view of a boat trailer constructed according to the invention.
Figure 2 is a fragmentary rear elevational view.

Continuing with a more detailed description of the drawing, reference numeral 10 denotes a tubular tongue constituting the longitudinal portion of the main frame of the trailer and to which is bolted a longitudinally disposed channel member 11. The channel member 11 is, in turn, welded at $a$ to a cross-member 12 to affix the latter to the tongue at a point slightly aft of the mid-section of the tongue. The cross-member 12 is preferably constructed from channel iron and is inverted to present its web to the web of the channel member 11 for welding as described.

Suspension of the trailer wheels 13 on the main frame is accomplished in the manner to be presently described through the medium of a novel "wishbone" subframe arrangement to produce the desired "knee-action" which reduces transmission of road shocks to the main frame and thus minimizes damaging vibrations in the boat hauled on the trailer.

Figure 3:
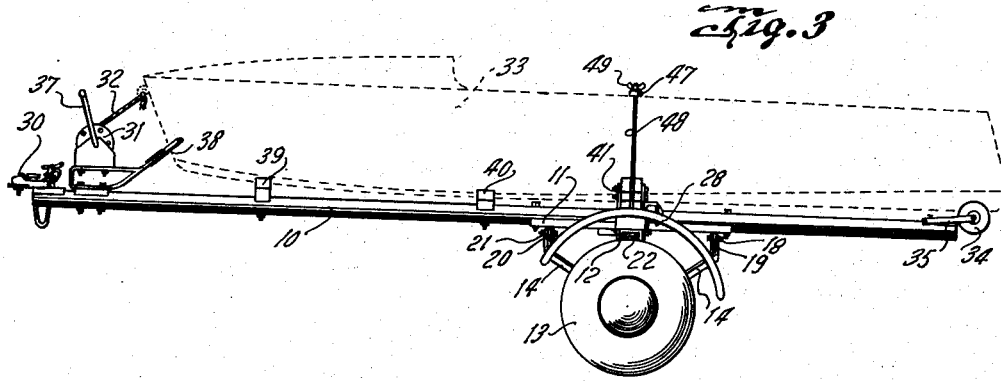
Figure 3 is a side elevational view on a reduced scale.
Figure 4:
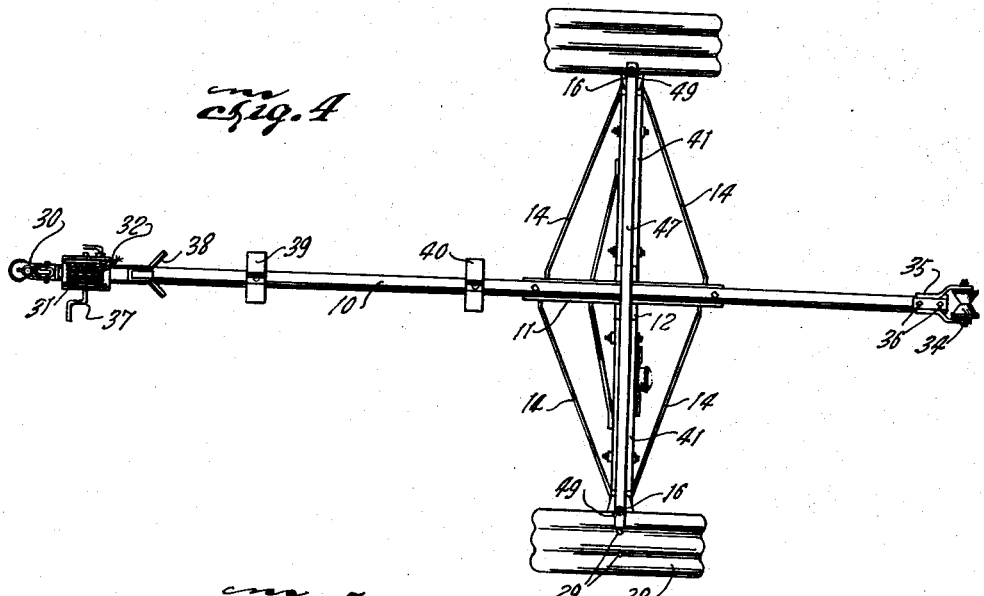
Figure 4 is a top plan view.
Figure 5:
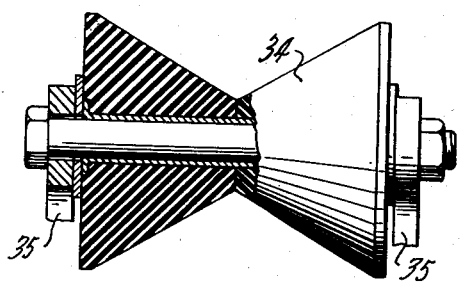
Figure 5 is a detail view of the keel roller, partly in section.

Two of the aforementioned sub-frames are provided, one on each side of the tongue 10. Each sub-frame is made up of a pair of straps 14 whose outer ends 15 are welded at $b$ (Fig. 2) to the edges of a plate 16. To the plate 16 is also welded an end of a stub axle 17 which carries a rubber tired wheel 13. The straps 14 are upwardly and divergently bent into a substantially V-shape, one of the straps being pivotally connected, by means of a bolt 18, to a depending ear 19 welded to the underside of the channel member 11 at its rear end. The companion strap 14 is similarly connected to an ear 20 welded to the channel member 11 adjacent its forward end by means of a bolt 21 (Fig. 3).

The two sub-frames, made up of straps 14, are identical in construction, hence the same reference numerals are employed to identify like parts in each assembly. Structural similarity in the sub-frames makes them interchangeable.

Supported on each plate 16 is a coil spring 22, held in position by a spring clip 23. On the upper end of the spring rests an end of the cross-member 12. A clip 24 secures the upper end of the spring against displacement and is in turn held by a bolt 25 which serves with a companion bolt 26 to fasten to the end of cross-member 12 a mounting 27 for a fender 28. Bolts 29 hold the fenders 28 on their mountings 27.

On the forward end of the tongue 10 is a trailer hitch 30 of more or less conventional manufacture and adjacent the hitch 30 is a winch 31 on which is wound a cable 32. An end of the cable 32 is attached to the bow of a boat 33 which is in alignment with a keel roller 34 rotatably arranged in a mounting 35 secured by bolts 36 (Fig. 1) to the rear end of the tongue 10. By rotating the crank 37 of the winch 31, the cable 32 is wound on the latter, pulling the boat 33 onto the trailer, the keel pulley, by virtue of its V-shaped groove, engaging and guiding the keel plate of the boat and preventing lateral displacement of the latter until the boat is brought up against the bow yoke 38 and the keel rests on the longitudinally spaced keel blocks 39 and 40, mounted on the tongue 10.

On each side of the tongue 10 and supported by the cross-member 12 of the main frame is an angular member 41. These members jointly form a cradle to support the boat 33 at a point spaced rearwardly of its midsection. Each member 41 is held pivotally at its inner end between a pair of parallel uprights 42 by means of a bolt 43. The outer end of each member 41 is adjustable vertically through the medium of parallel straps 44, to which the member is pivotally attached at c, the straps having a longitudinal row of apertures 45 which selectively receive a bolt 46 extending through the cross-member 12. Thus, the cradle may be adjusted to accommodate boats of different bottom designs.

When a boat is in place on the trailer, a batten 47 is extended across the top thereof and is held firmly in place by rods 48 whose upper ends are threaded and extended through apertures in the ends of the batten 47 to receive wing nuts 49. The lower ends of the rods 48 are shaped into hooks 50 which engage in apertures provided in upstanding ears 51 welded to the fender mountings 27. By rotating the wing nuts 49, the batten 47 is held securely against the boat to prevent its being bounced from the keel blocks, cradle and the roller 34.

The trailer has a license mounting 52 and a tail light 53 whose wires 54 are passed through a hole made in the tongue 10. The wires extend through the hollow tongue to its forward end where they may be conveniently connected to wires leading to the tow car.

Manifestly, the construction as shown and described is capable of some modification and such modification as may be construed to fall within the scope and meaning of the appended claim is also considered to be within the spirit and intent of the invention.

What is claimed is:

In a boat trailer the combination comprising a tongue and a cross-member having an apertured ear affixed to each end thereof, two angular boat supporting members, a mounting for each of said members consisting of a pair of relatively parallel uprights affixed at their lower ends to said cross-member in juxtaposition to said tongue, a pair of upright straps having a longitudinal series of matched apertures adapted to selectively receive a bolt passed through said cross-member adjacent its outer end to adjust the height of said straps above said cross-member, means pivotally securing one of said angular boat supporting members between the upper ends of said affixed uprights at a point spaced outwardly from the inner end of said supporting member, means for pivotally attaching the opposite end of said angular boat supporting member between the upper ends of said straps, a rigid batten above and parallel with said cross-member adapted to engage the top of a boat disposed on said boat supporting members and means extending from each end of said batten and connected to said ears to hold said batten in firm engagement with said boat.

WILLIS H. MILLER.

References Cited in the file of this patent

UNITED STATES PATENTS

| Number | Name | Date |
| --- | --- | --- |
| 748,212 | Patterson | Dec. 29, 1903 |
| 2,203,619 | Schroter et al. | June 4, 1940 |
| 2,219,401 | Sampsell | Oct. 29, 1940 |
| 2,314,076 | Casner | Mar. 16, 1943 |
| 2,332,991 | Commire | Oct. 26, 1943 |
| 2,442,248 | Sampsell | May 25, 1948 |
| 2,503,535 | Yarbrough | Apr. 11, 1950 |
| 2,571,213 | Cunningham et al. | Oct. 16, 1951 |